(12) United States Patent
Lawrence

(10) Patent No.: US 6,177,211 B1
(45) Date of Patent: Jan. 23, 2001

(54) DETACHABLE ROPE BATTERY HANDLE ASSEMBLY

(75) Inventor: Thomas E. Lawrence, Inver Grove Heights, MN (US)

(73) Assignee: GNB Technologies, Inc., Mendota Heights, MN (US)

(*) Notice: Under 35 U.S.C. 154(b), the term of this patent shall be extended for 0 days.

(21) Appl. No.: 09/197,022

(22) Filed: Nov. 20, 1998

(51) Int. Cl.$^7$ ....................................................... H01M 2/10
(52) U.S. Cl. ..................... 429/187; 429/176; 16/DIG. 15
(58) Field of Search ................................. 429/187, 176; 16/DIG. 15

(56) References Cited

U.S. PATENT DOCUMENTS

| | | |
|---|---|---|
| D. 266,757 | 11/1982 | Campbell et al. . |
| D. 292,696 | 11/1987 | Sahli . |
| 971,876 | 10/1910 | Apple . |
| 1,461,995 * | 7/1923 | Young . |
| 1,472,997 | 11/1923 | Stevenson . |
| 1,540,155 | 6/1925 | Wydom et al. . |
| 1,567,799 | 12/1925 | Galloway . |
| 1,639,492 | 8/1927 | Dunzweiler . |
| 1,697,063 | 1/1929 | Holland . |
| 1,927,920 | 9/1933 | Colley . |
| 1,938,158 | 12/1933 | Steele . |
| 2,277,976 | 3/1942 | Helmenstine . |
| 2,289,824 | 7/1942 | Brogden . |
| 2,460,363 | 2/1949 | Prentice . |
| 2,503,794 | 4/1950 | Brown . |
| 2,951,615 | 9/1960 | Crane . |
| 3,016,136 | 1/1962 | Poupitch . |
| 3,092,520 | 6/1963 | Buskirk et al. . |
| 3,093,515 | 6/1963 | Rector . |
| 3,144,196 | 8/1964 | Sindars . |
| 3,167,808 | 2/1965 | Lindenberg et al. . |
| 3,248,144 | 4/1966 | Hinds . |
| 3,770,511 | 11/1973 | Winterbottom et al. . |
| 3,797,876 | 3/1974 | Gummelt . |
| 3,845,542 | 11/1974 | Sabatino . |
| 3,956,022 | 5/1976 | Fox . |
| 4,013,819 | 3/1977 | Grabb . |
| 4,029,248 | 6/1977 | Lee . |
| 4,374,188 | 2/1983 | Campbell . |
| 4,448,863 | 5/1984 | Terrell . |
| 4,632,888 | 12/1986 | Kump et al. . |
| 4,673,625 | 6/1987 | McCartney et al. . |
| 4,791,702 | 12/1988 | McVey . |
| 5,144,719 | 9/1992 | Arthur . |
| 5,232,796 | 8/1993 | Baumgartner . |
| 5,242,769 | 9/1993 | Cole et al. . |
| 5,283,137 | 2/1994 | Ching . |
| 5,415,956 | 5/1995 | Ching . |
| 5,440,785 | 8/1995 | McDonald . |
| 5,565,283 | 10/1996 | Chalasani et al. . |
| 5,624,772 | 4/1997 | McVey et al. . |
| 5,637,420 | 6/1997 | Jones, Jr. et al. . |
| 5,670,274 | 9/1997 | Forrer . |

FOREIGN PATENT DOCUMENTS

| | | |
|---|---|---|
| 869329 | 5/1961 | (GB) . |
| 1453977 | 10/1976 | (GB) . |

* cited by examiner

*Primary Examiner*—John S. Maples
(74) *Attorney, Agent, or Firm*—Leydig, Voit & Mayer, Ltd.

(57) ABSTRACT

A battery comprising a rope handle which engages a standard structure on a conventional battery container. The rope handle comprises end portions coupled to a rope portion, the end portions being adapted to engage substantially vertical, elongated channels which are standard structures in the end walls of the battery container. The end portions comprise downwardly extending leg portions from which arms extend outwardly. When the end portion is in position in the channel, the legs extend through the channel and the arms are disposed below the channel such that the end portion is secured to the battery container.

14 Claims, 3 Drawing Sheets

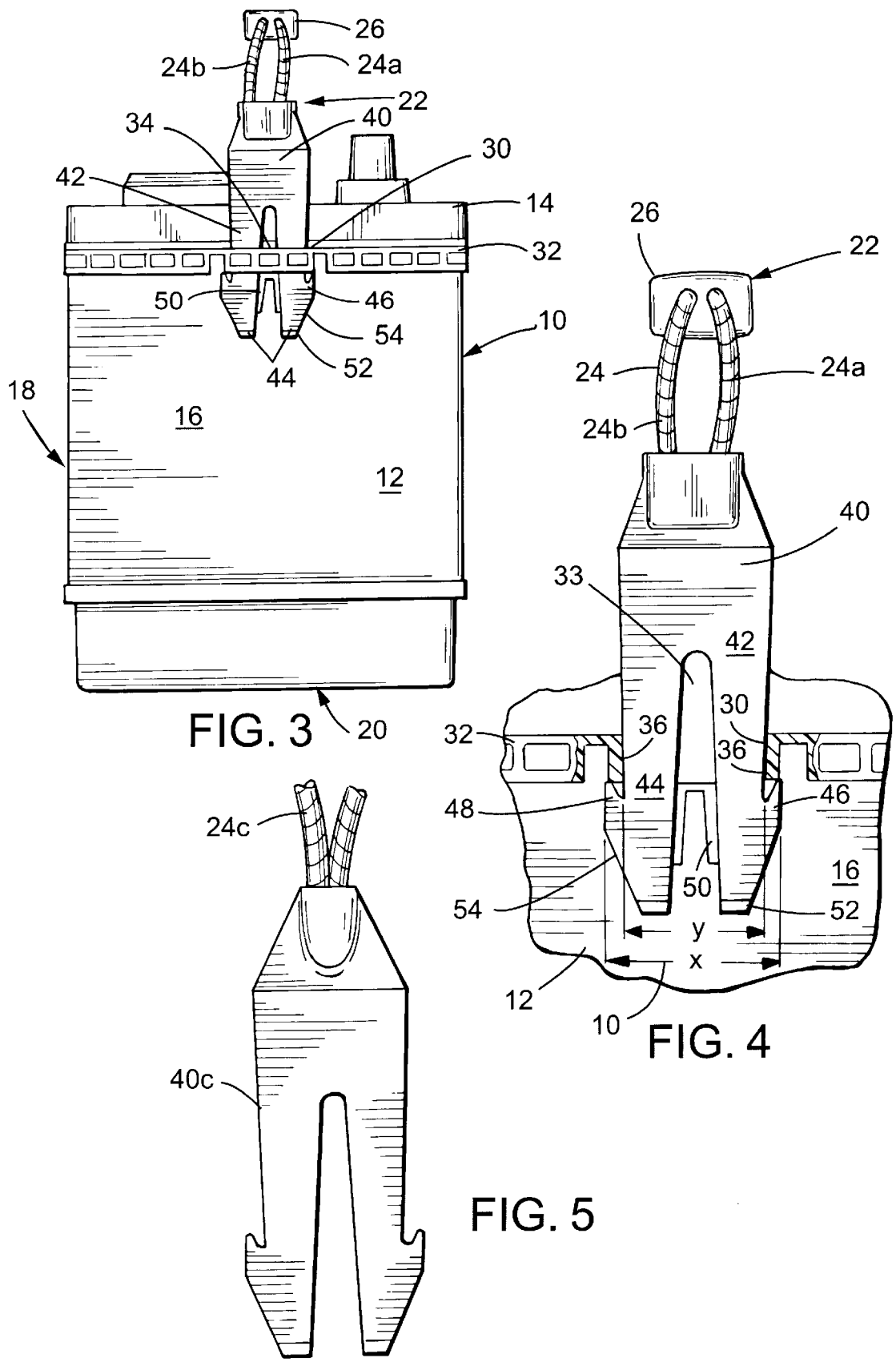

DETACHABLE ROPE BATTERY HANDLE ASSEMBLY

FIELD OF THE INVENTION

The invention relates to handles for carrying batteries, and more particularly to a rope type battery carrying handle that is removably attached to the battery container via standard battery structures.

BACKGROUND OF THE INVENTION

Starting, lighting, and ignition (SLI) batteries are typically used in automotive, recreational, and other applications, are heavy, cumbersome, and usually require two hands for carrying. The desirability of providing such batteries with attachable/detachable handles for facilitating carrying, placement, and retrieval of such batteries has long been known. Such handles are a particular convenience in batteries designed for use in boats or in uninterrupted power supply (UPS) applications which must be frequently moved for storage, service, or recharging.

Bail-type handles, which are known in the art, typically comprise a U- or C-shaped member attached to opposing sides of a battery casing, either on its container or cover. With such handles, the battery may be carried in much the same fashion as a picnic basket or bail.

Substantially rigid bail-type handles are known in the art. A variety of such handle designs have been proposed for carrying batteries. Detachable, substantially rigid bail handles are disclosed, for example, in U.S. Pat. No. 3,093,515 to Rector, U.S. Pat. No. 3,956,022 to Fox, U.S. Pat. No. 4,029,248 to Lee, U.S. Pat. No. 4,673,625 to McCartney et al., U.S. Pat. No. 5,232,796 to Baumgartner, U.S. Pat. No. 5,242,769 to Cole et al., and U.S. Pat. Des. 292,696 to Sahli.

Rope-type handles are likewise known in the art. Rope-type handles typically have one or more injection molded plastic parts coupled by flexible rope sections and, accordingly, are physically highly flexible. The rope sections are generally a braided synthetic material such as polypropylene.

According to one type of rope handle design, the ends of the rope handle are manually fed into two holes and coupled to the battery container. In the battery disclosed in U.S. Pat. No. 3,092,520 to Buskirk et al. the rope handle is coupled to the battery container by cementing the ends of the rope in recesses in projections on the sides of the battery container. Alternately, the ends of the rope handle may include an enlarged molded plastic portion and may be pressed into slots underneath the handle bracket area as shown, for example, in U.S. Pat. No. 3,797876 to Gummelt and U.S. Pat. No. 4,013,819 to Grabb. According to other designs, the ends of the rope may be enlarged as shown for example in British Patent 869,329, or the ends coupled or welded together as shown for example in British Patent 869,329 and British Patent 1,453,977.

Rope handle designs have also included looped rope portions extending from the ends of a molded plastic grip portion as shown, for example, in U.S. Pat. No. 971,876 to Apple, U.S. Pat. No. 4,791,702 to McVey, and U.S. Pat. No. 5,242,769 to Cole et al. The looped rope portions are then coupled to the battery container via dedicated protrusions extending from the walls of the battery by looping the rope around the protrusion and then securing it into a recess or the like.

Installation of these rope handle designs, however, may be labor intensive. Threading the ends of the rope through openings and properly securing the ends to the battery container, or securing the loop ends around a protrusion and into a recess can be quite time consuming. Moreover installation of rope handles generally requires the operator or user to have full access to walls of the battery to manipulate the flexible rope.

Additionally, these designs generally require specialized handle brackets to be molded into specific containers. This can result in increased costs in the form of mold and tooling costs, as well as increased labor and downtime costs during changeover. Further, storage and floor space costs increase, as the battery manufacturer must maintain larger inventories.

OBJECTS OF THE INVENTION

It is a primary object of the invention to provide a rope handle design that contributes to the production of an economical battery. A related object of the invention is to provide a rope handle design that minimizes manufacturing and inventory costs.

It is a more specific object of the invention to provide a rope handle design that may be utilized with an existing, conventional battery container design, and requires no specialized tooling for molding of the battery container.

It is a further object of the invention to provide a rope handle that may be readily and quickly assembled onto a battery container.

These and other objects and advantages of the invention will be apparent to those skilled in the art upon reading the following summary and detailed description and upon reference to the drawings.

SUMMARY OF THE INVENTION

In accomplishing these and other objects of the invention, there is provided a rope handle having specific mating end portions which engage conventional structure on an existing battery container and couple the handle to the battery. The end portions are coupled, either mechanically or by molding, to the rope portion of the handle, and include two downwardly depending legs having two outwardly extending arms. The standard battery container design includes an elongated channel, extending substantially downwardly through a portion of the container end wall. During assembly, each handle end portion is inserted into the elongated channel in the battery container wall such that the downwardly depending legs are elastically deformed by drawing the legs toward one another to minimize the overall width of the end portion at the outwardly extending arms. This allows the end portion to advance into the channel. As the arms emerge from the channel, the legs, which are biased toward the outward position, return toward their original position, securing the end portion and the handle to the container.

Inasmuch as the end portions may be molded to the rope portion of the handle, the handle may be economically fabricated. Further, the handle requires no specialized tooling to be associated with the container mold. Rather, a standard container is utilized, minimizing both fabrication and inventory costs. Additionally, as the handle may be easily assembled into the container wall, assembly costs are likewise minimized, yielding a battery that is economical to fabricate and assemble.

DESCRIPTION OF THE DRAWINGS

FIG. 3 is an end view of the battery and rope handle of FIG. 1.

FIG. 4 is an enlarged fragmentary cross-sectional view taken along line IV—IV in FIG. 2.

FIG. 5 is an enlarged fragmentary view of a second embodiment of a rope handle constructed in accordance with teachings of the invention.

DETAILED DESCRIPTION OF THE INVENTION

Figure 1:
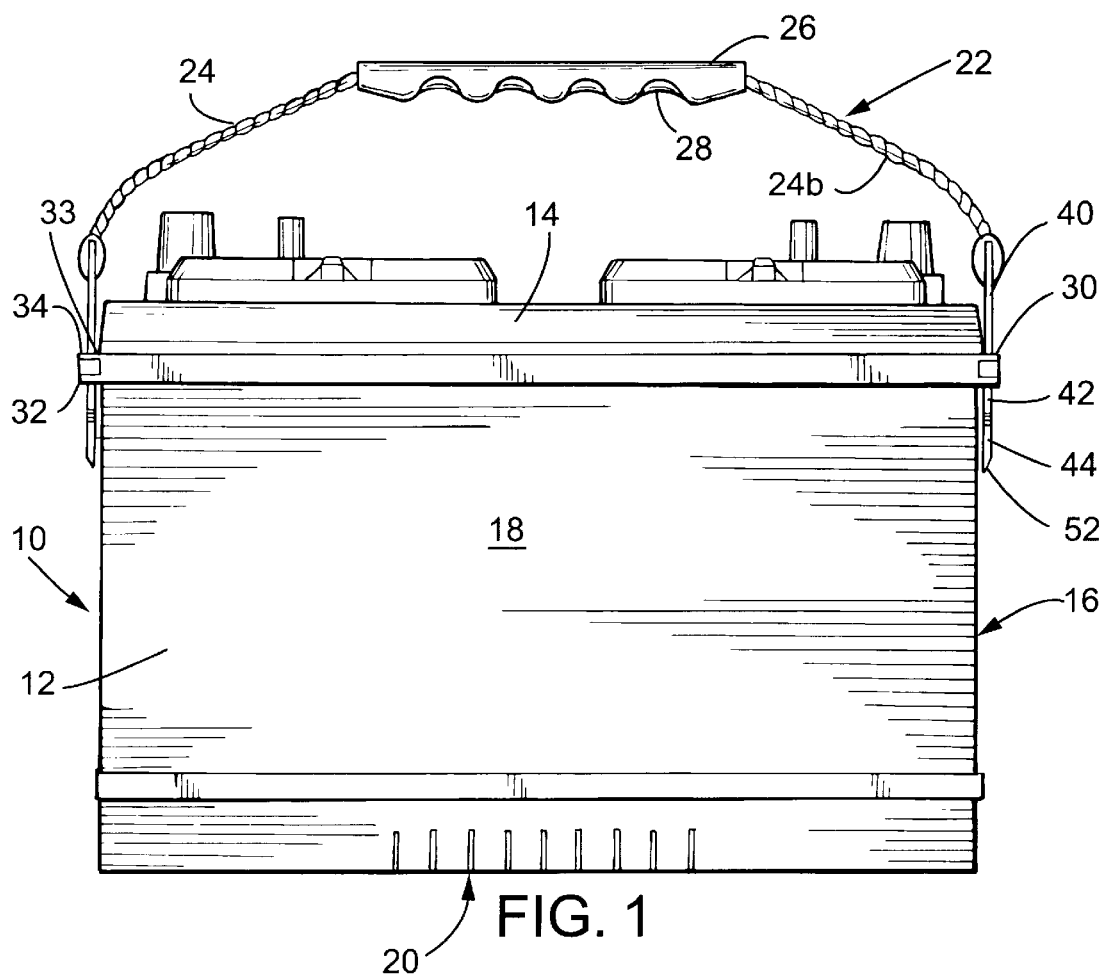
FIG. 1 is a side elevational view of a battery comprising a rope handle constructed in accordance with teachings of the invention.
Figure 2:
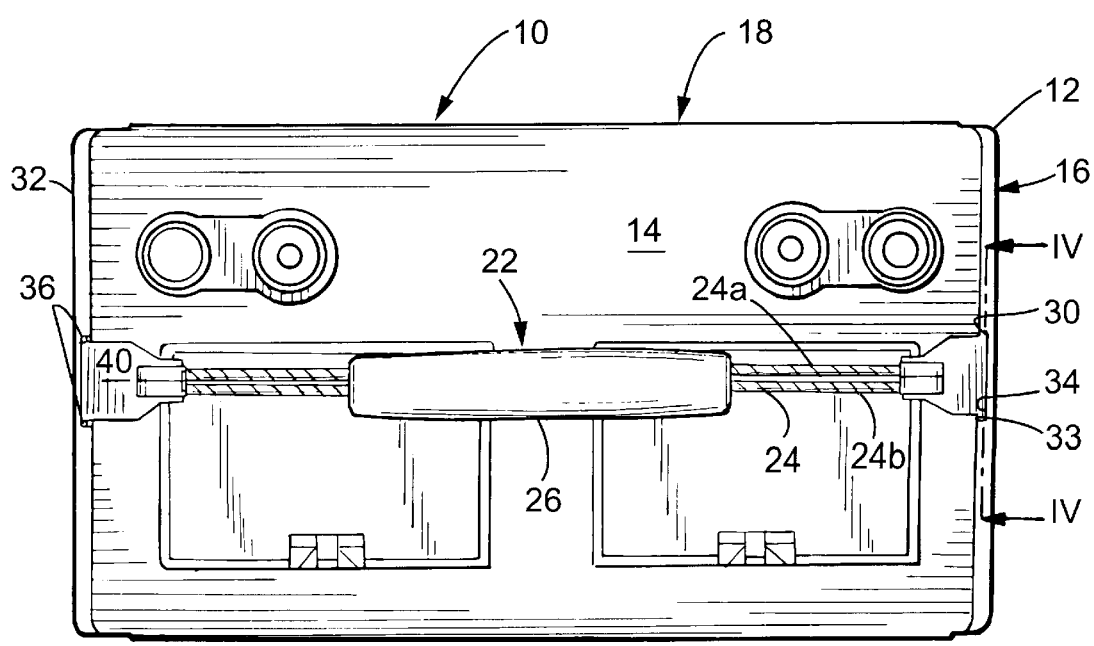
FIG. 2 is a top plan view of the battery and rope handle of FIG. 1.

Turning now to the drawings, there is shown in FIG. 1, a battery 10 having a container 12 and a lid 14. The container 12 includes end walls 16, side walls 18, and a bottom 20 and houses the internal components (not shown) of the battery 10. The battery 10 further includes an elongated rope-type handle 22, which includes a flexible rope portion 24. In the battery 10 illustrated, the handle further includes a grip portion 26 disposed substantially centrally on the elongated handle 22. The grip portion 26 preferably includes a series of indentations 28 for receiving the user's fingers to provide carrying comfort. The grip portion 26 is preferably molded of a polymeric material such as polypropylene.

It will be appreciated that the rope portion 24 may comprise one or more distinct pieces of rope. By way of example only, if the rope portion 24 includes a single elongated structure, the grip portion 26 may be substantially centrally disposed on the single structure. Alternately, the rope portion 24 may comprise two or more pieces of rope, the ends of the grip portion 26 being coupled to the rope 24 or rope pieces, either mechanically, or by molding the handle 26 to the rope 24 or pieces.

In accordance with the invention, the ends of the handle 22 are provided with a specific molded structure which engages a standard structure on opposing walls (16 or 18) of the container 12. More specifically, the opposite walls (16 or 18) of the container 12, preferably the end walls 16, are each provided with a ledge through which a substantially vertical channel 30 extends. The preferred embodiment of the invention utilizes a standard container design in which the ledge is in the form of an elongated protrusion 32 provided along the upper portion of each end wall 16. As seen most clearly in FIGS. 3 and 4, the channel 30 extends through the elongated protrusion 32. The channel 30 is elongated having a back wall 33, front wall 34, and side walls 36.

Figure 6:
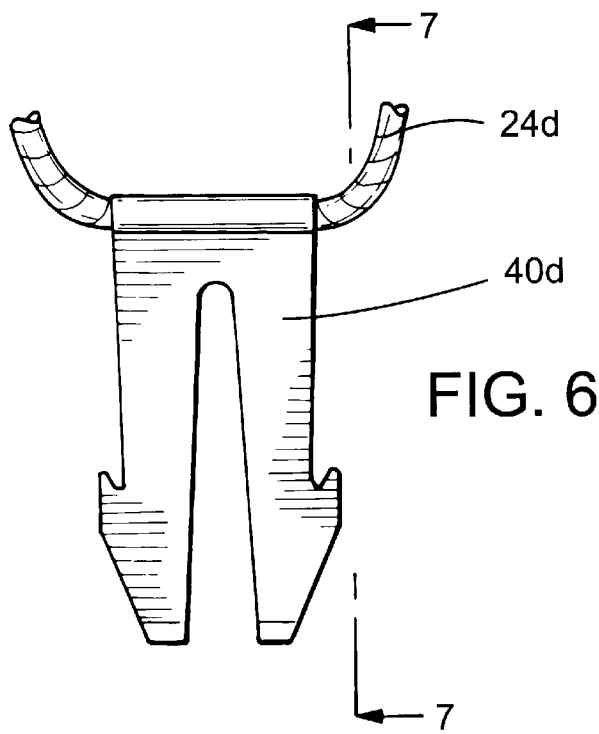
FIG. 6 is an enlarged fragmentary view of a third embodiment of a rope handle constructed in accordance with teachings of the invention.
Figure 7:
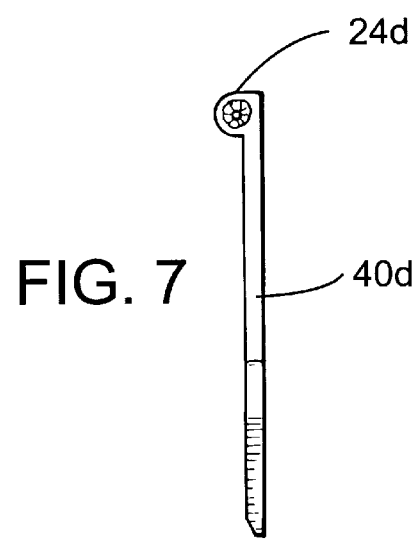
FIG. 7 is a cross-sectional view of the third embodiment of the rope handle taken along line VII—VII in FIG. 6.

The handle 22 is provided with end portions 40, which are preferably molded to the distal ends of the rope portion 24. The end portions 40 are preferably formed of a relatively strong, but resilient polymeric material, such as polypropylene, although alternate materials may be utilized so long as they provide these desired characteristics. It will be appreciated that the structural relationship between the rope portion 24 and the end portions 40 may be varied. For example, the rope portion 24 may include two elongated pieces 24a, 24b disposed in a parallel arrangement, the end portions 40 being molded or secured to the distal ends of the rope pieces 24a, 24b, as shown in FIGS. 3 and 4. Alternately, the rope portion may be continuous at the distal ends, the end portions 40c being molded or secured to a bent portion of the rope portion 24c as shown in the embodiment illustrated in FIG. 5. Similarly, the end portions 40d may be molded or secured to looped distal ends of the rope portion 24d, as in the embodiment illustrated in FIGS. 6 and 7.

In order to engage the standardized structure (in the form of a channel 30) on the battery container 12, the end portions 40 are provided with a specialized mating structure that may be readily inserted into the channel 30. As the end portion 40 is inserted into the channel 30, it elastically deforms, creating a restoring biasing force. As the distal end of the end portion 40 passes through the channel 30, the restoring force causes the end portion 40 to snap back toward its original position, securing the handle 22 to the container 12.

In accomplishing this objective, each end portion 40 includes an inverted "V" structure 42 having downwardly depending legs 44. Thus, as the end portion 40 is inserted into the channel 30, the downwardly depending legs 44 may be pivoted toward and even over one another to effectively decrease the width x of the end portion 40 to permit it to advance through the channel 30.

In order to secure the handle 22 to the container, each end portion 40 is provided with arms 46, which extend outwardly from the edges of the legs 44. According to an important feature of the invention, the width x of the end portion 40 along the outwardly extending arms 46 is greater than the width y of the channel 30 between the side walls 36 of the channel 30. It will thus be appreciated that when inserted into the channel 30, the legs 44 of the end portion 40 may be advanced toward one another until the width x of the end portion 40 is slightly smaller than the width y of the channel 30 to permit passage of the end portion 40. Once the outwardly extending arms 46 pass beyond the channel 30, the legs 44 are permitted to return toward their original position such that the arms 46 retain the end portion 40 in the channel 30, as shown in FIG. 4.

In order to further ensure that the end portion 40 remains securely in position in the channel 30, the outwardly extending arms 46 each further comprise an upwardly extending hook-like portion 48. As may be seen in FIG. 4, the hook 48 captures the side wall 36 of the channel 30 to deter the end portion 40 from sliding back out through the channel 30.

Additionally, the end wall 16 of the battery container 12 may further be provided with an inverted "U-shaped" or "V-shaped" protrusion 50. As shown in FIGS. 3 and 4, when a handle end portion 40 is disposed in the channel 30 and the end portion 40 disposed within the channel 30 toward the battery container wall 16, the inverted "U-shaped" or "V-shaped" protrusion 50 is disposed adjacent the inside edge of the inverted "V" structure 42 of the end portion 40. It will be appreciated by those skilled in the art that the "U-shaped" or "V-shaped" protrusion 40 prevents the legs 44 of the inverted "V" structure 42 of the end portion 40 from being drawn toward each other.

In order to facilitate insertion of the end portion 40 into the channel 30, the distal ends of the legs 44 of the end portions 40 are provided with a ramped surface 52. Additionally, the outer surfaces 54 of the arms 46, which extend outwardly from the legs 44 of the inverted "V" structure 42 are angled upwardly and outwardly. It will be appreciated by those skilled in the art that these ramped and angled surfaces 52, 54, facilitate insertion of the end portion 40 into the channel 30. More specifically, as the end portion 40 is advanced into the channel 30, the outer surfaces 54 of the arms 46 slide along the side walls 36 of the channel 30, causing the legs 44 to advance toward each other to permit the passage of the outwardly extending arms 46 through the channel 30. Once the arms 46 have passed the side walls 36 of the channel 30, the legs 44 return to their original position, securing the end portion 40 to the battery container 12. It will also be appreciated by those skilled in the art that the handle may be removed from the container 12 by squeezing the legs 44 together and sliding end portion 40 from the channel 30.

Figure 8:
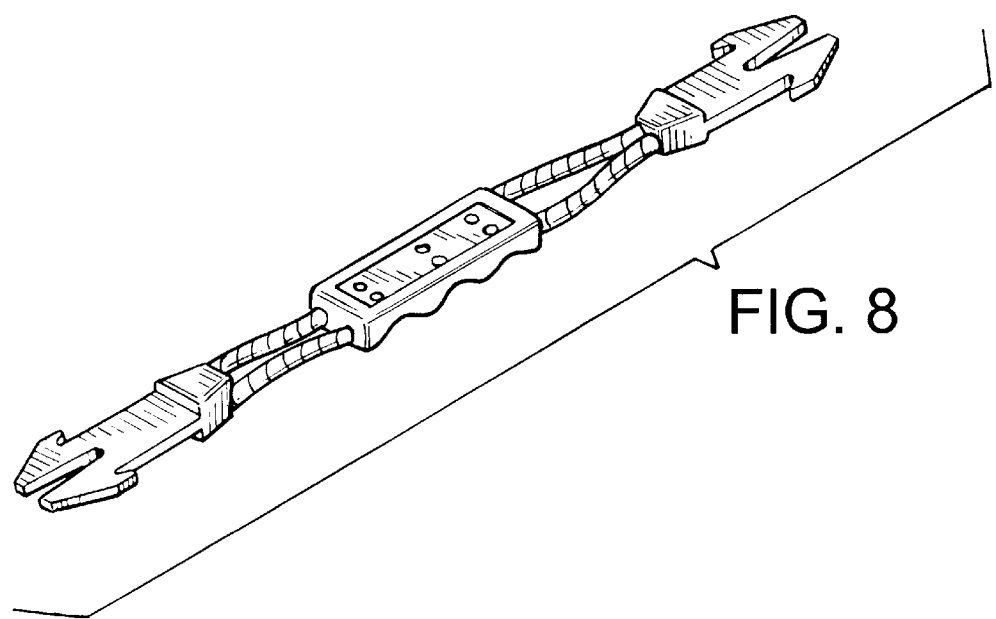
FIG. 8 is a perspective view of a fourth embodiment of a rope handle constructed in accordance with teachings of the invention.

FIG. 8 illustrates yet another possible form of the invention.

In summary, the invention provides a detachable rope handle 22 that may be readily attached to a battery container 12 of a existing conventional design. The rope handle 22 comprises a specialized structure that engages existing channels 30 in the container end walls 16. The rope handle 22 comprises molded end portions 40 that include downwardly depending legs 44 from which arms 46 extend outwardly. When in position within the channel 30, the arms 46 are disposed outside of and below the walls of the channel 30, preventing the end portions 40 from moving back through the channel 30.

The rope handle 22 constructed in accordance with teachings of the invention incorporates a rope portion and injection molded polymeric end portions, and, accordingly, is economical to fabricate. Additionally, because it mates with a conventional battery container design, the manufacturer need not fabricate and maintain in inventory a battery container design dedicated to the rope handle. Further, because the end portions of the handle are relatively rigid and include ramped and angled surfaces that facilitate insertion into the channels of the container, the handle may be quickly and readily assembled onto the battery.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention.

I claim as my invention:

1. An electric storage battery comprising a battery container and a handle coupled thereto, the battery container having two substantially vertical parallel walls, the vertical parallel walls each having a ledge extending therefrom, said ledges each having a substantially vertical channel extending therethrough, the channel having side walls having a lower surface, said handle comprising a rope portion and two end portions coupled to the rope portion, said end portions having two substantially longitudinally extending legs and an arm extending outwardly from each leg, the end portion being adapted to be positioned extending through the channel with the arms being disposed adjacent the lower surface of the channel side walls to couple the handle to the battery container such that the engagement of the arms with the lower surface prevents the end portion from vertical movement within the channel.

2. The electric storage battery of claim 1 further comprising at least one protrusion extending from an outer surface of the container wall, the legs having an inverted substantially U-shaped inside surface, the protrusion being disposed along at least a portion of the inside surface of the legs whereby the protrusion deters movement of the end portion in a substantially vertical direction.

3. The electric storage battery of claim 1 wherein the legs have an inverted substantially U-shape and the end portion is resilient such that as it is advanced downward into the channel, the legs may move toward one another until the outwardly extending arms are no longer engaged with the side walls of the channel.

4. The electric storage battery of claim 3 further comprising at least one protrusion extending from an outer surface of the container wall, the legs having an inverted substantially U-shaped inside surface, the protrusion being disposed along at least a portion of the inside surface of the legs whereby the protrusion deters movement of the end portion in a substantially vertical direction.

5. The electric storage battery of claim 1 wherein the outwardly extending arms have opposed outer surfaces that are angled upwardly and outwardly such that the opposed outer surfaces engage the side walls of the channel as the end portion is advanced downward within the channel whereby the legs are pivoted toward one another.

6. The electric storage battery of claim 2 wherein the outwardly extending arms have opposed outer surfaces that are angled upwardly and outwardly such that the opposed outer surfaces engage the side walls of the channel as the end portion is advanced downward within the channel whereby the legs are pivoted toward one another.

7. The electric storage battery of claim 3 wherein the outwardly extending arms have opposed outer surfaces that are angled upwardly and outwardly such that the opposed outer surfaces engage the side walls of the channel as the end portion is advanced downward within the channel whereby the legs are pivoted toward one another.

8. The electric storage battery of claim 4 wherein the outwardly extending arms have opposed outer surfaces that are angled upwardly and outwardly such that the opposed outer surfaces engage the side walls of the channel as the end portion is advanced downward within the channel whereby the legs are pivoted toward one another.

9. The electric storage battery of claim 1 wherein the end portion has a distal end distal the rope portion, the distal end of the end portion having a ramped surface to facilitate insertion of the end portion into the channel.

10. The electric storage battery of claim 5 wherein the end portion has a distal end distal the rope portion, the distal end of the end portion having a ramped surface to facilitate insertion of the end portion into the channel.

11. The electric storage battery of claim 1 further comprising a grip portion disposed adjacent a section of the rope portion.

12. The electric storage battery of claim 11 wherein the rope portion comprises a single piece of rope.

13. The electric storage battery of claim 1 wherein the end portions are molded to the rope portion.

14. The electric storage battery of claim 11 wherein the end portions and the grip portion are molded to the rope.

* * * * *